United States Patent [19]

Debruyne et al.

[11] 3,748,653

[45] July 24, 1973

[54] MICROPROGRAM MEMORY FOR ELECTRONIC COMPUTERS

[75] Inventors: Guy Jules Achille Pierre Debruyne, Saint-Maur; Jacques Michel Jean Bienvenu, Paris, both of France

[73] Assignee: Societe Industrielle Honeywell Bull (Societe anonyme), Paris, France

[22] Filed: Oct. 8, 1971

[21] Appl. No.: 187,717

[30] Foreign Application Priority Data

Oct. 16, 1970 France ............................ 7037488

[52] U.S. Cl. ......... 340/173 BB, 340/173 R, 307/238

[51] Int. Cl. ............................................ G11c 11/40

[58] Field of Search ................................ 340/173 BB

[56] References Cited

UNITED STATES PATENTS

| | | | |
|---|---|---|---|
| 3,331,058 | 7/1967 | Perkins | 340/172.5 |
| 3,336,579 | 8/1967 | Hermann | 340/172.5 |
| 3,348,197 | 10/1967 | Akers | 340/172.5 |
| 3,434,116 | 3/1969 | Anacker | 340/173 |
| 3,585,607 | 6/1971 | Dehann | 340/173 |
| 3,588,830 | 6/1971 | Duda | 340/173 |
| 3,659,275 | 4/1972 | Marshall | 340/173 |

*Primary Examiner*—Terrell W. Fears
*Attorney*—Ronald T. Reiling et al.

[57] ABSTRACT

A microprogram store having an updating store for holding substitute information elements for use with a fixed microprogram store of an electronic computer, such substitute information elements being replacements for corresponding erroneous or missing information elements in the fixed store, wherein the updating store is an erasable store operated in parallel with the fixed store and supplying an information element held therein whenever an information element in the fixed store is addressed and a corresponding corrected information element is found in the erasable store.

9 Claims, 3 Drawing Figures

INVENTORS
Guy Jules Achille Pierre Debruyne
and Jacques Michel Jean Bienvenu
BY

ATTORNEY

MICROPROGRAM MEMORY FOR ELECTRONIC COMPUTERS

BACKGROUND OF THE INVENTION

This invention relates to memories for electronic computers, and more particularly, to memories containing microprograms (firmware); i.e., programs for controlling the more elemental operations of such computers.

Such memories may be realized from semiconductor devices, such as diodes and transistors, fabricated in integrated circuit form and enclosed in housings. These semiconductor memories, termed fixed, permanent, or read-only memories, constitute the more simple form of such memories, are of lower cost, and demonstrate excellent performance. Usually, these fixed memories are coded or programmed to hold the desired program once for life at the time of their fabrication.

The memories so provided are adapted to the particular requirements of their employment, and the information which they hold; i.e., their program, can no longer be altered after the memory elements have been enclosed in their housings. However, in spite of simulation tests of microprograms performed before the production of these memories, it may prove necessary, particularly at the time of checkout of the computers, to alter certain instructions contained in these memories either to correct errors or to improve the operation of the machines. It then becomes necessary to replace certain elements of the memory, usually a small number, by other elements having the modified program.

The obtaining of these new elements causes significant delays because it is necessary to fabricate all of the parts, which slows the checkout of the computer. Furthermore, the cost is increased because it is necessary to provide new tooling, particularly diffusion and photoetching masks to fabricate a small number of elements.

Two methods are known for facilitating the alteration of the microprograms.

The first method consists of utilizing for the memory elements to be replaced, elements which can be programmed in an irreversible manner at the time of their preparation for employment. These memory elements comprise, for example, fusible conductive connections which can be severed by the passage therethrough of a high current. Usually, the coding or programming of these elements can be carried out only from external to the memory. This method, although attractive, has disadvantages. Thus, the performance of the fusible members is not flawless, because the destruction thereof may damage the memory elements. Further, the density of information contained in such elements, due to the presence of the fusible members, is two to four times less than that of the program elements at the time of their fabrication. Finally, the fusible members increase the size of the memories.

The second method consists of providing, in lieu of a fixed memory, a memory termed an erasable, nonpermanent, or read/write memory. This method also is not without disadvantages. Thus, the size and the price of such an erasable memory are four to five times those of a fixed memory. Further, the performance of an erasable memory is inferior, in that the access time is greater, the electrical power that it consumes is greater, and the information that it contains can inadvertently disappear. Finally, inasmuch as the modifications to be applied to a microprogram are usually few in number in relation to the total amount of information in the microprogram, the utilization of an erasable memory is not optimal, since such a memory provides for all of the information to be alterable in order to actually alter only a small portion thereof.

Accordingly, it is the object of the present invention to remedy these disadvantages.

SUMMARY OF THE INVENTION

In accordance with the invention, a microprogram memory for an electronic computer having a fixed memory programmed during its fabrication is characterized by comprising an updating erasable memory which is operated in parallel with the fixed memory and holds corrected information corresponding to erroneous information in the fixed memory and an information selection device which is connected to the output terminals of both the erasable memory and the fixed memory and enables transmission of only correct information, wherein the correct information transmitted issues either directly from the fixed memory or from the erasable memory as a substitute for erroneous information held in the fixed memory.

The present invention is applicable not only to the case where the fixed memory employed is a semiconductor fixed memory coded during the fabrication stage, but also to all cases wherein the fixed memory is of a type wherein physical alteration of its contents is difficult or impossible. The apparatus of the present invention affords the advantage of eliminating all such physical intervention by providing for substitution by means of logical apparatus.

In a preferred embodiment, the selection device is a two-channel switch wherein the first channel is coupled to the output terminal of the fixed memory and the second channel is coupled to the output terminal of the erasable memory. Normally, the first channel is enabled for transmission and the second channel is disabled for transmission, as when the information provided by the fixed memory is correct, whereas the second channel is enabled and the first channel disabled when the information provided by the fixed memory is erroneous and must be replaced with information provided by the erasable memory.

This selection switch may be controlled by an electrical signal supplied by the erasable memory and occurring only when the desired information corresponds to an erroneous information element in the fixed memory and to a correct information element in the erasable memory.

Preferably, the erasable memory comprises an associative memory, which holds the fixed memory addresses of information elements to which a correction must be applied and a read/write memory containing the corrected information elements. The associative memory and the read/write memory are coupled in isomorphic fashion, such that to one address corresponds one information element. The associative memory furnishes the control signal to the switch when a match is found between the address of the desired information and one of the addresses which the associative memory holds and controls the read/write memory to deliver to the switch the information element which it contains corresponding to such address.

Preferably, the switch is formed of a pair of two-input AND-gates, an inverter, and a two-input OR-gate. The first AND-gate has its input terminals respectively connected to the read/write memory and to the associative memory, whereas the second AND-gate has its input terminals respectively connected to the fixed memory and, through the inverter, to the associative memory. The output terminals of the AND-gates are connected to respective input terminals of the OR-gate.

BRIEF DESCRIPTION OF THE DRAWING

The invention will be described with reference to the accompanying drawing, wherein.

DESCRIPTION OF THE PREFERRED EMBODIMENT

Figures 1, 2, 3:
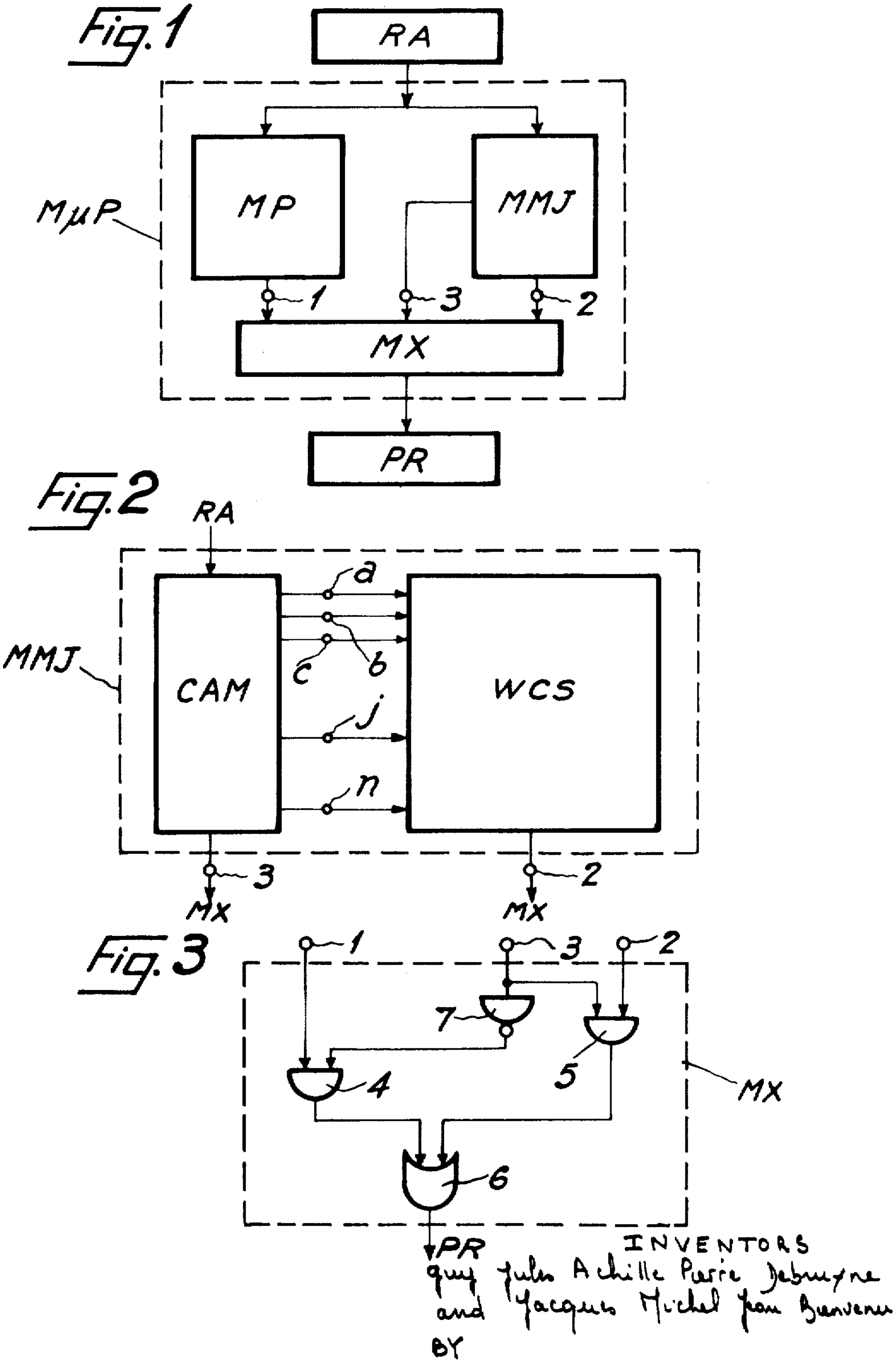
FIG. 1 is a block diagram of a portion of an electronic computer having a microprogram memory in accordance with the instant invention.
FIG. 2 is a block diagram of the updating memory contained in the microprogram memory of FIG. 1.
FIG. 3 is a block diagram of the multiplexer or switch provided in the microprogram memory of FIG. 1.

The portion of the electronic computer shown in FIG. 1 comprises, as is known, a microprogram memory M$\mu$P which is controlled by an associated address register RA and which furnishes instructions to a processing device or processor PR.

In accordance with the instant invention, microprogram memory M$\mu$P comprises in parallel a fixed, or permanent, memory MP, in which the working microprogram of the computer is recorded in permanent form, for example at the time of fabrication of memory MP, and an updating memory MMJ, holding information corresponding to certain corrected information of the microprogram held in fixed memory MP.

Fixed memory MP and updating memory MMJ are interrogated in parallel by address register RA and furnish their information to processor PR through a switch MX, which has a pair of input terminals 1 and 2. Terminals 1 and 2 are connected to the respective output terminals of memory MP and memory MMJ. In addition, switch MX has a control input terminal 3 for receiving a signal from updating memory MMJ. The operation of the portion of the computer shown in FIG. 1 takes place as follows:

During each cycle of the machine address register RA simultaneously interrogates fixed memory MP and updating memory MMJ. For each interrogation, memory MP supplies an information element to terminal 1 of switch MX, but this information element only will be transmitted by switch MX to processer PR if it is correct. If this information element is erroneous updating memory MMJ disables, by means of a signal which it delivers to terminal 3, the channel (channel No. 1) of switch MX connected to terminal 1 and supplies to terminal 2 the corrected information element, which reaches processor PR through the channel (channel No. 2) of switch MX connected to terminal 2. Thus the computer is always controlled by correct information, even though erroneous information may be held in memory MP and presented to input terminal 1 of switch MX.

FIG. 2 shows a preferred embodiment of the updating memory MMJ. This embodiment of updating memory MMJ comprises an associative memory CAM connected for interrogation by register RA and holding the addresses of words of fixed memory MP to which a correction must be applied. Memory MMJ comprises also a read/write memory WCS whose contents can be changed by electrical means and which holds corrected information elements of the microprogram.

Associative memory CAM comprises a bank of registers. The contents of each register of memory CAM can be modified during write cycles. Each of these registers holds the address of a word of fixed memory MP to which a correction must be applied, each different address being held only in a single position (or register) of associative memory CAM. Comparator circuits are coupled to each position and deliver a signal when there is identity between the contents of such position and the interrogation information presented to the input terminal of memory CAM; i.e. the address provided by register RA. Each position of associative memory CAM has a respective output terminal *a, b, c,* . . . *n*. Each of output terminals *a–n* is connected to a word input terminal of memory WCS, whose output terminal, in turn, is connected to terminal 2.

The memory CAM is further provided with a signal generator for controlling switch MX. The output signal of this generator is applied to terminal 3 of switch MX. Such an output signal is delivered by the signal generator when there is a match between the address provided by register RA and one of the addresses held in memory CAM. The signal received by terminal 3 denotes the presence of a corrected information element in updating memory MMJ and enables the transmission of this corrected information element to processor PR through channel 2 of switch MX, while simultaneously disabling the transmission to processor PR of the erroneous information element provided by fixed memory MP.

Accordingly, updating memory MMJ comprises an electrically alterable memory WCS and a memory of addresses CAM, both having the same number of words. The length of the words in memory CAM and register RA is the same, whereas the length of the words in fixed memory MP and read/write memory WCS is identical. Thus, the memory of addresses CAM assures an isomorphic correspondence between the address of the erroneous information element held in fixed memory MP and the corresponding corrected information element held in memory WCS, even though memories MP and WCS have different capacities relative to the numbers of words therein.

When, during an interrogation of memory CAM by register RA, a match is found between the address provided by register RA and the address held in a register *j* (with $a<j<n$) of memory CAM, an electrical signal is delivered to terminal 3. This signal disables the channel of switch MX connected to terminal *l* and enables the channel of switch MX connected to terminal 2. In addition, an output signal is delivered by terminal *j* of memory CAM, which signal controls memory WCS to read out the information element held in word *j* therein (the information element that corresponds to a corrected instruction of memory MP). This information element read out is delivered to terminal 2 and through switch MX to processor PR.

The corrected information element held in memory MMJ is only found at one location therein. Thus, during an interrogation by register RA, if there is identity between an address held in memory CAM and the address supplied by register RA, only one output terminal *j* indicates such identity and selects a corresponding word in memory WCS.

The associative memory CAM may be formed of Fairchild ML4102 elements, whereas read/write memory WCS may be formed of Fairchild ML9035 elements.

If successive modifications must be applied to the same information element, successive writing into the same position (or word) of memory WCS will be performed, each erasing the preceding.

During the checkout phase of the computers, the writing into memory MMJ of corrections carried by an external information-bearing medium (punched cards, tapes, disks, etc.) may be accomplished from a suitable and simple peripheral device, independent of the computer. If, during utilization of the machine, updating of the microprograms is determined to be necessary, this can be effected with the aid of this device or from a peripheral unit already connected.

A particularly simple embodiment of switch MX is shown in FIG. 3. This embodiment comprises two AND-gates 4 and 5, or OR-gate 6 and an inverter 7. The two input terminals of AND-gate 5 are respectively connected to input terminal 2 and input terminal 3. The two input terminals of AND-gate 4 are respectively connected to input terminal 1 and, through inverter 7, to input terminal 3. The output terminals of AND-gates 4 and 5 are connected to respective ones of the two input terminals of OR-gate 6, whose output controls processor PR.

When, during an interrogation by register RA the corresponding information in memory MP is correct, the two input terminals of AND-gate 4 are supplied with useful signals and the information represented by such signals is enabled to reach processor PR, AND-gate 5 not then being enabled. Conversely, when this information is erroneous, the two input terminals of AND-gate 5 are supplied with useful signals and AND-gate 4 is disabled, so that then the information from memory WCS reaches processor PR.

Accordingly, the instant invention enables resolving the problems of changing and updating microprograms with a simple inexpensive device, which is completely electrically alterable, is versatile, and permits of retaining the advantages of programming semiconductor memories during fabrication. The corrections and/or additions to the microprograms are substituted for the errors and/or omissions of the original microprograms by means of logical apparatus.

We claim:

1. A microprogram memory for an electronic computer having a fixed memory programmed during the fabrication thereof, comprising: an updating erasable memory coupled to operate in parallel with said fixed memory, memory coupled to operate in parallel with said fixed memory, said erasable memory being adapted to hold corrected information elements corresponding to erroneous information elements in said fixed memory, and an information selection device connected to the output terminals of both said erasable memory and said fixed memory for enabling transmission of only correct information elements, wherein a correct information element is provided by said selection device either directly from said fixed memory or from said erasable memory as a substitute for an erroneous information element held in said fixed memory, wherein said selection device is a switch having two channels, the first of said channels being coupled to the output terminal of said fixed memory and the second of said channels being coupled to the output terminal of said erasable memory, said first channel being normally enabled for transmission and said second channel being normally disabled when the information element provided by said fixed memory is correct, whereas said second channel is enabled for transmission and said first channel is disabled when the information element provided by said fixed memory is erroneous and must be replaced by an information element from said erasable memory, wherein said switch is controlled by an electrical control signal supplied by said erasable memory, wherein said erasable memory comprises an associative memory holding the addresses of information elements in said fixed memory to which a correction must be applied and a read/write memory holding the corrected information elements, said associative memory and said read/write memory being coupled in isomorphic manner, whereby one address in said associative memory corresponds to one information element in said read/write memory, and wherein said associative memory furnishes said control signal to said switch when a match is found between the address of the desired information element and one of the addresses held in said associative memory and controls said read/write memory to deliver to said switch the information element held in said read/write memory corresponding to said one address, wherein said switch comprises a pair of two-input AND-gates, an inverter and a two-input OR-gate, the first of said AND-gates having the input terminals thereof respectively connected to said read/write memory and said associative memory, the second of said AND-gates having the input terminals thereof respectively connected to said fixed memory and, through said inverter, to said associative memory, the output terminals of said two AND-gates being connected to respective input terminals of said OR-gate.

2. The microprogram memory of claim 1, coupled for transmitting information elements to a processor and further comprising an interrogation address register coupled to provide an address to both said fixed memory and said associative memory and means for transferring the information element transmitted by said switch to said processor.

3. A microprogram memory for an electronic computer having a fixed memory programmed during the fabrication thereof, comprising: an updating erasable memory coupled to operate in parallel with said fixed memory, said erasable memory being adapted to hold corrected information elements corresponding to erroneous information elements in said fixed memory, and an information selection device connected to the output terminals of both said erasable memory and said fixed memory for enabling transmission of only correct information elements, wherein a correct information element is provided by said selection device either directly from said fixed memory or from said erasable memory as a substitute for an erroneous information element held in said fixed memory, wherein said selection device is a switch having two channels, the first of said channels being coupled to the output terminal of said fixed memory and the second of said channels being coupled to the output terminal of said erasable memory, said first channel being normally enabled for transmission and said second channel being normally disabled when the information element provided by said fixed memory is correct, whereas said second channel is enabled for transmission and said first channel is disabled when the information element provided by said fixed memory is erroneous and must be replaced by an information element from said erasable memory, wherein said switch is controlled by an electrical control signal supplied by said erasable memory, wherein said erasable memory comprises an associative memory holding the addresses of information elements in said fixed memory to which a correction must be applied and a read/write memory holding the corrected information elements, said associative memory and said read/write memory being coupled in isomorphic manner, whereby one address in said associative memory corresponds to one information element in said read/write memory, and wherein said associative memory furnishes said control signal to said switch when a match is found between the address of the desired information element and one of the addresses held in said associative memory and controls said read/write memory to deliver to said switch the information element held in said read/write memory corresponding to said one address,wherein said switch comprises first and second gate means, said first gate means having the input terminals thereof respectively connected to said read/write memory and said associative memory, said second gate means having the input terminals thereof respectively connected to said fixed memory and coupled to said associative memory, the output terminals of said first and second gate means coupled to provide said correct information elements.

4. The memory of claim 3 further comprising inverter means coupled in the coupling between said respective input terminal of said second gate means and said associative memory.

5. The memory of claim 4 further comprising third gate means having the input terminals thereof respectively coupled to said output terminals of said first and second gate means and wherein the output terminal of said third gate means provides said correct information elements.

6. The memory of claim 5 wherein said first and second gate means each provide an AND function and wherein said third gate means provides an OR function.

7. A memory system comprising:

A. a main memory having some faulty memory elements;

B. a correction memory comprising 1. a plurality of locations having addresses identical to the addresses in said main memory of said faulty memory elements, 2. a further memory having a plurality of memory positions each including correct information for replacing information designated for said faulty memory elements, wherein said further memory has the same addresses as corresponding locations of said plurality of locations, and 3. means for coupling said further memory with said plurality of locations so that said memory positions of said further memory are accessed when said plurality of locations are addressed;

C. means for simultaneously addressing said main memory and said plurality of locations;

D. means for generating a control signal when the address provided by said means for addressing compares to one of said addresses of said plurality of locations; and E. switch means coupled to receive information from said main memory and said further memory, said switch means including an output terminal, said switch means normally enabled to transfer said information from said main memory to said output terminal and said switch means responsive to said control signal for transferring only the information from said further memory to said output terminal.

8. A system as in claim 7 wherein said switch means comprises:

A. first gate means coupled to transfer information from said further memory to said output terminal in response to said control signal; and B. second gate means coupled to transfer information from said main memory to said output terminal when said control signal is not generated by said means for generating.

9. A system as in claim 7 wherein said switch means comprises:

A. first and second two-input AND gate means;

B. inverter means;

C. means for coupling the inputs of said first gate means respectively to said further memory and to said means for generating said control signal;

D. means for coupling the inputs of said second gate means respectively to said main memory and, through said inverter means, to said means for generating said control signal.

* * * * *